US012179976B2

(12) United States Patent
Piazza

(10) Patent No.: US 12,179,976 B2
(45) Date of Patent: Dec. 31, 2024

(54) CAP INCLUDING A SECTION DELIMITED BY A DIVIDING WALL, WHICH CAN BE TORN, IF NECESSARY, BY MEANS INCLUDED IN THE CAP

(71) Applicant: Daniele Piazza, Correzzana (IT)

(72) Inventor: Daniele Piazza, Correzzana (IT)

( * ) Notice: Subject to any disclaimer, the term of this patent is extended or adjusted under 35 U.S.C. 154(b) by 86 days.

(21) Appl. No.: 18/019,176

(22) PCT Filed: Aug. 26, 2021

(86) PCT No.: PCT/IT2021/050267
§ 371 (c)(1),
(2) Date: Feb. 1, 2023

(87) PCT Pub. No.: WO2022/079743
PCT Pub. Date: Apr. 21, 2022

(65) Prior Publication Data

US 2023/0271759 A1 Aug. 31, 2023

(30) Foreign Application Priority Data

Oct. 15, 2020 (IT) ........................ 102020000024313

(51) Int. Cl.
*B65D 81/32* (2006.01)
*B65D 47/36* (2006.01)
(Continued)

(52) U.S. Cl.
CPC ......... *B65D 51/2842* (2013.01); *B65D 81/32* (2013.01); *A61J 1/2093* (2013.01); *B65D 81/3211* (2013.01)

(58) Field of Classification Search
CPC .... A23C 2270/15; A61J 1/2093; B65D 25/08; B65D 81/32; B65D 81/3211;
(Continued)

(56) References Cited

U.S. PATENT DOCUMENTS 2,510,211 A * 6/1950 Cleary ............... B65D 5/48046 426/115
4,832,221 A * 5/1989 Manem ................ B65D 47/286 220/348
(Continued)

FOREIGN PATENT DOCUMENTS

GB 2 376 220 12/2002
JP 4543122 B1 * 9/2010 ......... B65D 51/2828
(Continued)

OTHER PUBLICATIONS

International Search Report for PCT/IT2021/050267, mailed Dec. 20, 2021, 4 pages.
(Continued)

*Primary Examiner* — Gideon R Weinerth
(74) *Attorney, Agent, or Firm* — NIXON & VANDERHYE

(57) ABSTRACT

Disclosed is a cap including a cavity delimited by a cylindrical side wall and by a discoidal base at a first end of the cap. The latter further includes a circular opening for accessing the cavity, obtained at a second end of the cap opposite the first end. A discoidal dividing wall is housed in the cavity of the cap between the base and the opening. The dividing wall is connected to the side wall along its circular edge to delimit, with the base and a portion of the side wall, a section inside the cap. A tongue protruding outside the cap penetrates the latter through the side wall connects to the dividing wall at an end inside the cap. Applying force to the tongue tending to remove it from the cap tears the dividing wall, opening the section and allowing the enclosed substance to exit the cap.

13 Claims, 5 Drawing Sheets

(51) Int. Cl.
*B65D 51/28* (2006.01)
*A61J 1/20* (2006.01)

(58) Field of Classification Search
CPC ............ B65D 81/3266; B65D 81/3222; B65D 51/2807; B65D 51/2842; Y10S 604/905
USPC .................... 206/219, 221, 222; 215/DIG. 8; 220/521, 502, 269, 270; 222/145.5; 426/76, 89, 90
See application file for complete search history.

(56) References Cited

U.S. PATENT DOCUMENTS 5,213,256 A * 5/1993 Cyr ........................ B65D 25/08 229/120.32
5,491,542 A * 2/1996 Nagashima ........ G03G 15/0865 222/DIG. 1
6,089,375 A * 7/2000 Johnson ................. B65D 25/08 206/541
8,551,545 B2 * 10/2013 Feldmeier .......... B65D 81/3244 229/80.5
10,017,317 B2 * 7/2018 Gillblad ............. B65D 81/3453
2006/0191805 A1 * 8/2006 Vogel ................... B65D 25/087 206/219
2010/0163439 A1 * 7/2010 Gutierrez Avendano .................... A61J 9/00 220/521
2011/0091614 A1 4/2011 Malone et al.
2011/0272379 A1 * 11/2011 Eghbaly ............. B65D 81/3211 215/6
2011/0290814 A1 12/2011 Lewis
2013/0149417 A1 * 6/2013 Malone .............. B65D 81/3211 426/112
2016/0175196 A1 * 6/2016 Leffler .................. A61J 7/0046 206/219
2018/0327142 A1 * 11/2018 Nikolic .................. B65D 25/08
2023/0271759 A1 * 8/2023 Piazza .................... B65D 81/32 206/222

FOREIGN PATENT DOCUMENTS

JP 2011-016581 1/2011
WO WO-9818689 A1 * 5/1998 ............. B65D 25/08
WO WO-2006036792 A1 * 4/2006 ......... B65D 21/0223
WO WO-2007055660 A1 * 5/2007 ............. B65D 25/08

OTHER PUBLICATIONS

Written Opinion of the ISA for PCT/IT2021/050267, mailed Dec. 20, 2021, 6 pages.

* cited by examiner

CAP INCLUDING A SECTION DELIMITED BY A DIVIDING WALL, WHICH CAN BE TORN, IF NECESSARY, BY MEANS INCLUDED IN THE CAP

CROSS-REFERENCE TO RELATED APPLICATIONS

This application is the U.S. national phase of International Application No. PCT/IT2021/050267 filed Aug. 26, 2021, which designated the U.S. and claims priority to IT Patent Application No. 102020000024313 filed Oct. 15, 2020, the entire contents of each of which are hereby incorporated by reference.

BACKGROUND OF THE INVENTION

Field of the Invention

The present invention finds application in the sector of containers comprising at least two sections separated by a dividing wall, which can be torn, if necessary, in order to allow a first substance enclosed in one of the two sections, to come into contact with a second substance enclosed in the other section. Such containers are, for example, used in the sector of probiotics. To maximize the efficacy of the probiotics, the latter are enclosed in a first, dry section. The second section instead contains a solution, which serves to carry the probiotics inside the human body. At the time of taking the probiotics it is necessary to tear the dividing wall, separating the two sections, in order to cause the probiotics to fall into the aforesaid solution.

Included among double-section containers, more precisely, those for which the present invention finds application, are containers comprising a container (such as, for example, a vial or a bottle) including one of the two sections and an opening, for accessing said section, which can be closed by a cap including both the other section and the dividing wall of the two sections.

The present invention refers, in particular, to a cap including a section delimited by a dividing wall, which can be torn, if necessary, by means included in said cap.

Description of the Related Art

Double-section containers for which the present invention finds application, usually comprise a container provided with an opening, which is reversibly closable by means of a cap. The latter includes a dividing wall, which separates a first section, inside the cap, from a second section corresponding to the volume of space inside the container. The cap comprises a cylindrical side wall, which is closed at the top by a discoidal base and connectable at the bottom to the container at the aforesaid opening, blocking it. The dividing wall is usually discoidal, it is preferably arranged parallel to the base of the cap and interposed between the latter and the opening of the container when the cap is connected to the same. Therefore, the first section is delimited by the base, by the dividing wall and by a portion (upper) of the side wall of the cap. Said side wall is telescopic or plastically collapsible. As a result of this, the base of the cap is translatable towards the dividing wall.

The cap includes a short tube housed inside the first section and integrally connected to the base at a first end. The second end of said tube, opposite to the first end, is duck-bill shaped and is close to the dividing wall. The tube is sufficiently long so that a translation of the base towards the dividing wall determines a perforation of the latter by the aforesaid duck-bill end. As a result of said perforation, when the cap is connected to the container, the first section is in communication with the volume of space inside the container (i.e. with the second section). After perforating the dividing wall, a first substance possibly enclosed in the first section (usually housed inside the aforesaid tube) thus falls into the container coming into contact with a second substance possibly contained therein.

In order to put the two sections into communication, it is necessary to exert, on the upper base of the cap, a pressure, which is sufficiently intense so as to cause the base to translate towards the dividing wall and perforate the latter by means of the duck-bill end of the tube. Despite being seemingly simple, said operation is actually quite difficult. In fact, a person is not always capable of applying such a force to the cap as to compress the latter and perforate the dividing wall.

SUMMARY OF THE INVENTION

It is the object of the present invention to overcome the aforesaid drawbacks by indicating an alternative cap to the one of the container with a double compartment described above, in which the dividing wall inside the cap can be torn more easily with respect to the method with which it occurs in known caps of the same type.

The subject of the present invention is a cap comprising:

- a cavity delimited by a side wall and by a base placed at a first end of said cap;
- an opening for accessing said cavity,
  - said opening being at least partially delimited by said side wall and being at a second end of said cap opposite to said first end;
- a dividing wall housed inside said cavity and connected to said side wall in an intermediate position between said base and said opening,
- said dividing wall being connected to said side wall along an edge thereof (of said dividing wall) so as to separate said cavity into:
  - a first portion delimited by said dividing wall, by said base and by a first portion of said side wall extending from said dividing wall to said base, said first portion of cavity corresponding to a section of said cap;
  - a second portion delimited by said dividing wall, by said opening and by a second portion of said side wall extending from said dividing wall to said opening,
- said cap, at said second portion of side wall, being reversibly connectable to a container comprising a cavity and an opening for accessing the same. Incidentally, the expression "reversibly connectable" is understood to mean that the cap is connectable to said container and can be disconnected from the latter an indefinite number of times.

Said cap being reversibly connectable to said container at the opening of the latter and in such a way that said second portion of cavity of said cap is in communication with said cavity of said container;

- means for at least partially tearing said dividing wall,
- when said cap is reversibly connected to said container, an at least partial tearing of said dividing wall putting said section into communication with said cavity of said container, wherein, according to the invention, said tearing means comprise a tongue including a first end and a second end opposite to said first end of the same, said second portion of side wall comprising a through hole, said tongue crossing said through hole so as:

to be housed in said second portion of cavity of said cap at a first section thereof (of said tongue) including the first end thereof (of said tongue)

and so as to lie outside said cavity of said cap at a second section thereof (of said tongue) including the second end thereof (of said tongue), said tongue, at said first section, being at least partially opposite to said dividing wall, said tongue being connected to said dividing wall at the first section thereof and being graspable by a person at the second section thereof, said tongue being at least partially sliding in said through hole, the connection between said dividing wall and said tongue being sufficiently intense so that, on applying a force to said tongue, at said second section, tending to cause said tongue to slide in such a way that said first end of the same moves close to said through hole, a sliding of said tongue in such a way that said first end of the same moves close to said through hole determines at least a partial tearing of said dividing wall by said tongue and at least a partial pulling of said dividing wall towards said through hole by said tongue, with a deformation of said dividing wall (for example, with the latter folding on itself).

Here and hereinafter in the present description, for presentation purposes, the expression "container" is understood to mean any container provided with at least one opening, which is reversibly closable by means of a cap.

By virtue of the presence of the tongue, the dividing wall inside the cap, the subject of the invention, can be torn more easily with respect to the method with which it occurs in known caps of the same type.

Other innovative features of the present invention are disclosed in the description below and referred to in the dependent claims.

According to an aspect of the invention, the tongue, at the first end thereof, is shaped so as not to be able to cross the through hole in the side wall of the cap.

Advantageously, according to this aspect of the invention, the tongue cannot be accidentally removed completely from the cavity of the cap.

According to this aspect of the invention, the tongue, at the first end thereof, has for example such a width that the cross-section of the tongue at the aforesaid first end is wider than the cross-section of the hole in the side wall of the cap.

According to another aspect of the invention, the dividing wall comprises one or more facilitated breaking lines, i.e. lines at which the dividing wall tends to tear easily on applying a torque of forces, at least partially opposite, respectively at two portions of the wall separate from said line. A facilitated breaking line is, for example, obtainable by removing material from the dividing wall along said line so that, at the latter, said dividing wall is thinner than in the zones of the same surrounding said line.

Advantageously, according to this aspect of the invention, by virtue of the presence of the facilitated breaking lines, the dividing wall can be torn even more easily as the traction force, which must be applied to the tongue to tear the dividing wall, is less intense with respect to the case in which there are no facilitated breaking lines.

According to another aspect of the invention, said one or more facilitated breaking lines extend, at least partially, along the edge of the dividing wall.

Advantageously, according to this aspect of the invention, the dividing wall tends to tear along the edge thereof. Thus, there is a smaller risk of an amount of substance contained in the section of the cap remaining in said section with a tearing of the dividing wall.

According to another aspect of the invention, the tongue is connected to the dividing wall at least at a section of the edge of the same.

According to another aspect of the invention, the edge of the dividing wall is circular, said edge section at which the tongue is connected to the dividing wall being diametrically opposite to a projection, orthogonal to the dividing wall, of the through hole on said edge.

According to this aspect of the invention, advantageously, the travel, which can be made by the tongue coming out (partially) of the cavity of the cap tearing the dividing wall, is maximum. Similar to the above, therefore, there is a smaller risk of an amount of substance contained in the section of the cap remaining in said section with a tearing of the dividing wall.

According to another aspect of the invention, one of the facilitated breaking lines extends over the whole edge of the dividing wall, or extends over the edge of the dividing wall, except for a section of said edge, including said projection, orthogonal to the dividing wall, of the through hole on said edge.

Advantageously, according to this aspect of the invention, the dividing wall can be entirely or almost entirely disconnected from the side wall of the cap. Therefore, there is an even smaller risk of an amount of substance contained in the section of the cap remaining in said section with a tearing of the dividing wall.

According to another aspect of the invention, the dividing wall comprises one or more facilitated folding lines, i.e. lines along which the dividing wall is easily foldable on itself. A facilitated folding line is, for example, obtainable by deforming (e.g. by compression) the dividing wall along said line in such a way that, at the latter, the dividing wall is flared with respect to the zones of the same surrounding said line.

Advantageously, according to this aspect of the invention, by virtue of the presence of the facilitated folding lines, the dividing wall can be torn even more easily as the traction force, which must be applied to the tongue to deform the dividing wall to pull the latter towards the through hole during the exit of the tongue from the cavity of the cap, is less intense with respect to the case in which there are no facilitated folding lines. That is, the resistance opposed by the dividing wall to the sliding of the tongue is lower.

According to another aspect of the invention, said one or more facilitated folding lines extend from one point to another of the edge of the dividing wall.

According to another aspect of the invention, said one or more facilitated folding lines are arranged orthogonally to a diameter of the edge of the dividing wall extending from said section of said edge at which the tongue is connected at the dividing wall, to said projection, orthogonal to the dividing wall, of the through hole on said edge.

Advantageously, according to this aspect of the invention, the dividing wall is even more easily deformable during an exit by the tongue from the section of the cap.

BRIEF DESCRIPTION OF THE DRAWINGS

Further objects and advantages of the present invention will become apparent from the following detailed description of embodiments thereof and from the accompanying drawings, given purely by way of non-limiting example, in which.

DESCRIPTION OF THE PREFERRED EMBODIMENTS

In the remainder of the present description, a figure may also be illustrated with reference to elements not expressly indicated in that figure, but in other figures. The scale and proportions of the various illustrated elements do not necessarily correspond to the real values.

Figure 1:
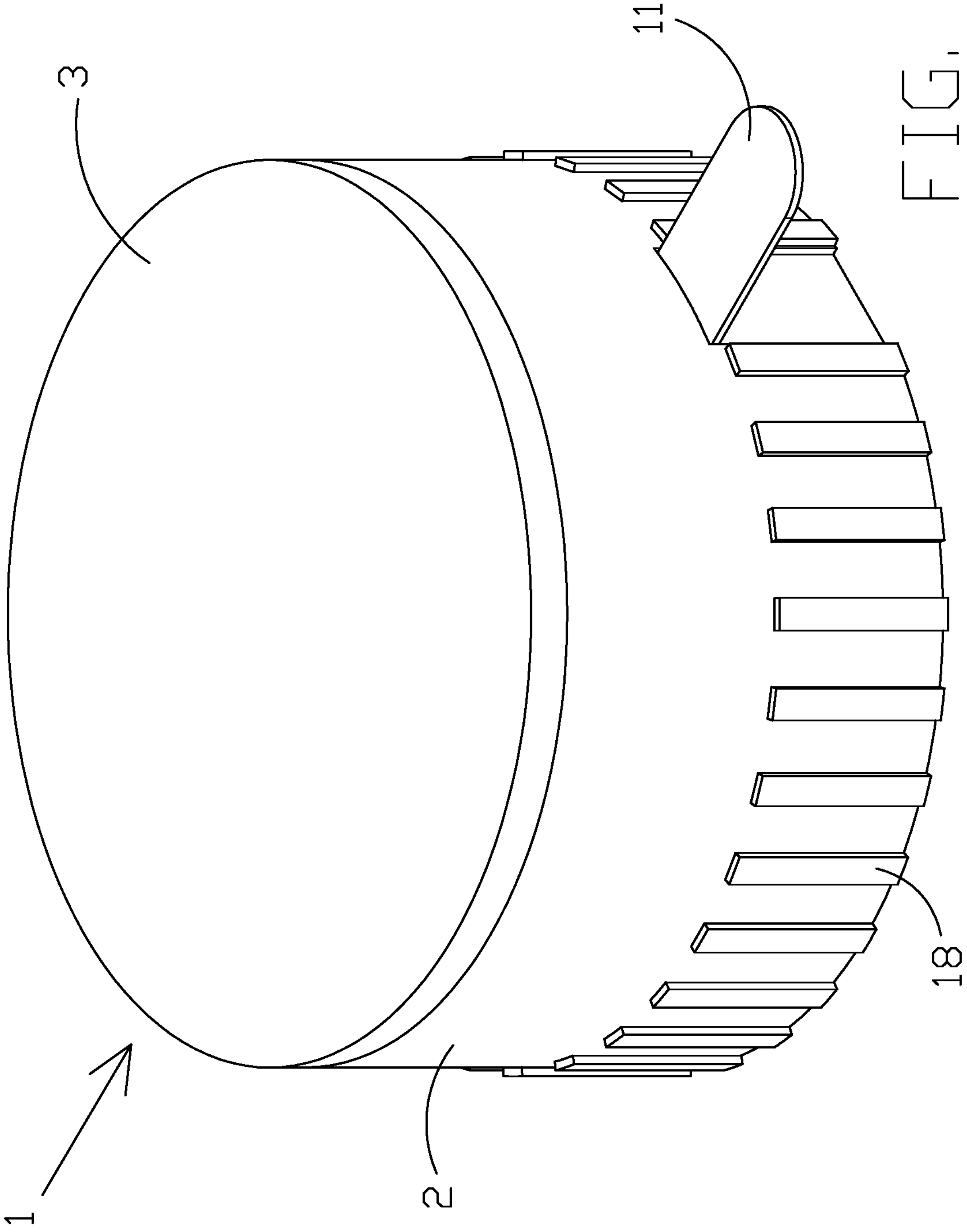
FIG. 1 shows a perspective view of a cap according to the present invention.
Figure 2:
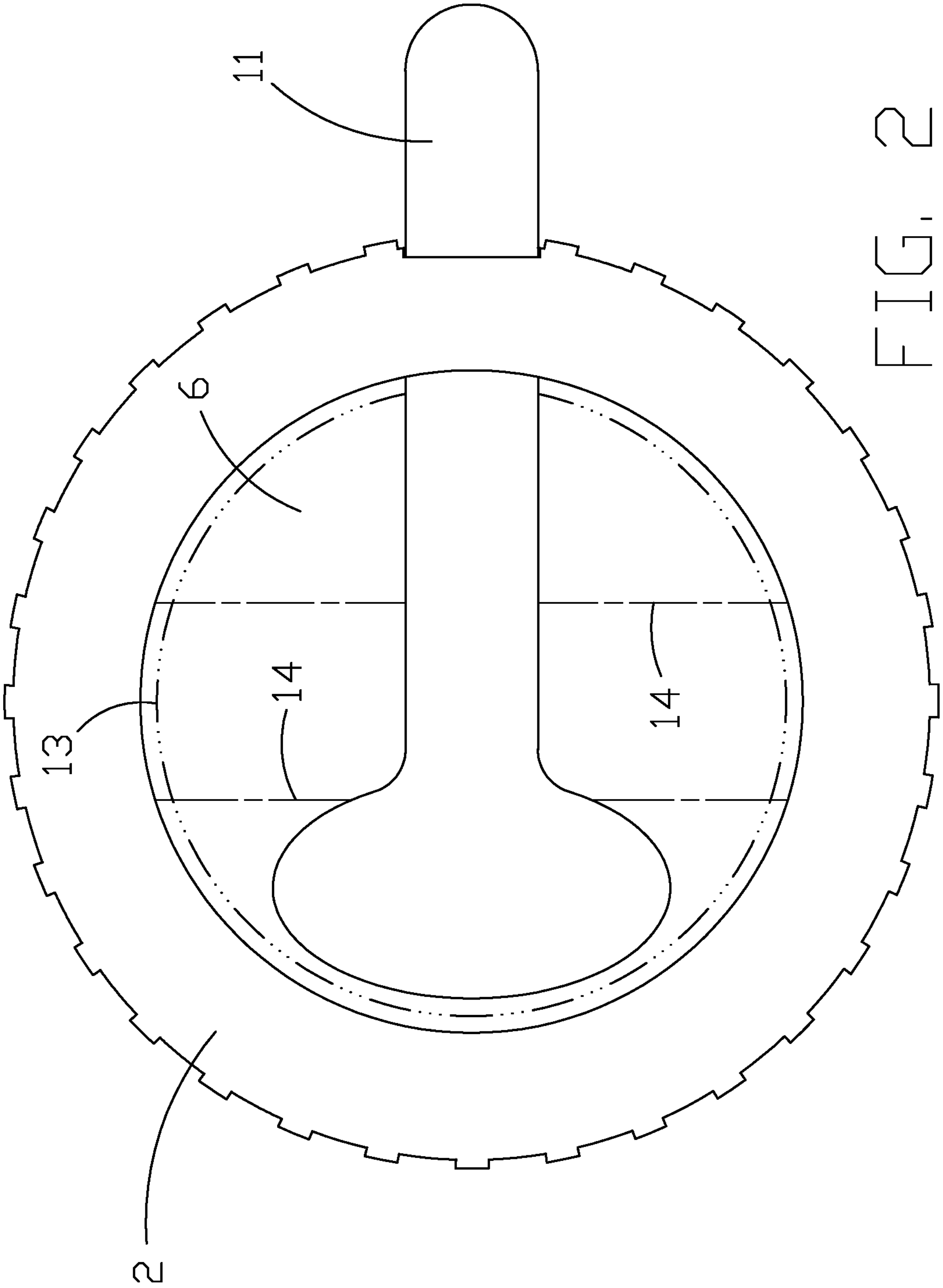
FIG. 2 shows a plan view from below of the cap in FIG. 1.
Figure 3:
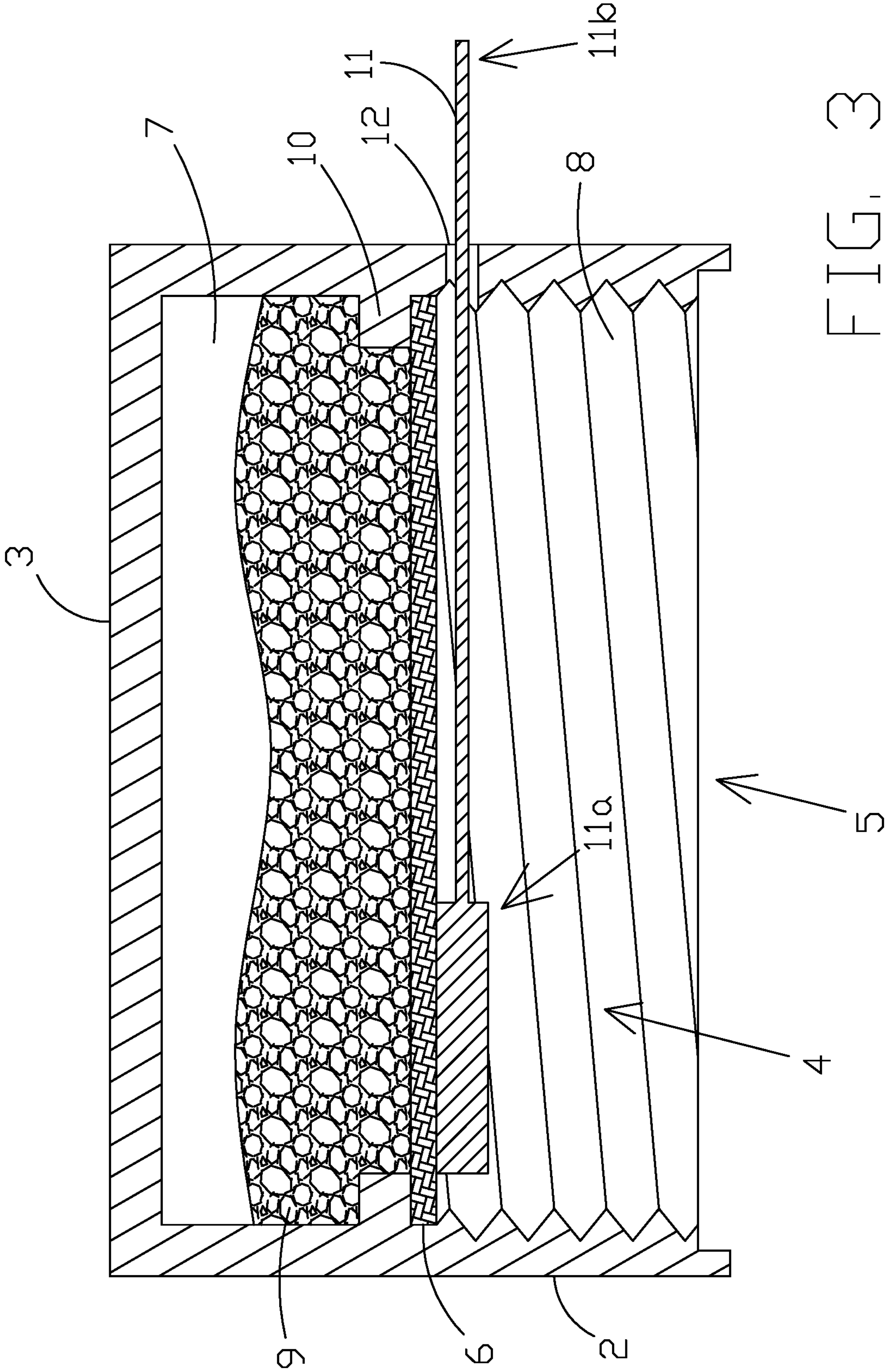
FIG. 3 shows a diagrammatic straight section of the cap in FIG. 1.

FIGS. 1 to 3 show a cap 1, the subject of the invention, comprising a side wall 2, which is preferably cylindrical. The wall 2, at one end of the cap 1 placed at the top in FIGS. 1 and 3, is closed by a base 3, which is preferably discoidal and arranged orthogonally to the wall 2. The latter, together with the base 3, delimits a cavity 4 included in the cap 1. The cavity 4 is accessible through an opening 5, preferably a circular opening, delimited by the wall 2 at another end of the cap 1 placed at the bottom in FIGS. 1 and 3 (and therefore opposite to the base 3). The circular edge, which delimits the opening 5, is preferably parallel to the base 3. In the light of the above, the wall 2, the base 3 and the opening 5 are shaped, as a whole thereof, like a straight cylinder.

The cap 1 also comprises a dividing wall 6 housed inside the cavity 4 and connected to the wall 2 in an intermediate position between the base 3 and the opening 5. The wall 6 is preferably also discoidal and orthogonal to the wall 2. Therefore, the wall 6 is preferably arranged parallel to the base 3. The wall 6 is connected to the wall 2 along the edge thereof (preferably circular) so as to separate the cavity 4 into a first portion 7, at the top in FIG. 3, and a second portion 8, at the bottom in FIG. 3. The portion 7 of the cavity 4 is delimited by the wall 6, by the base 3 and by a first portion of wall 2 extending from the wall 6 to the base 3. The portion 8 of the cavity 4 is delimited by the wall 6, by the opening 5 and by a second portion of wall 2 extending from the wall 6 to the opening 5. The portion 7 of the cavity 4 corresponds to a section of the cap 1, which is not accessible through any opening (in the configuration shown in FIG. 3) and preferably housing a substance marked by reference numeral 9. As shown below in the present description, at the portion 8 of the cavity 4 the cap 1 is reversibly connectable to a container 15 (visible in FIGS. 4 and 5). To this end, the wall 2, at the aforesaid second portion of the same (extending from the wall 6 to the opening 5), is preferably threaded internally.

The wall 2 preferably comprises a shelf 10 preferably shaped like a circular crown protruding from the wall 2 inside the cavity 4. The wall 6 is preferably opposite to the shelf 10 at the edge thereof. More precisely, it is preferably at the shelf 10 that the wall 6 is connected to the wall 2 so as to separate the section 7 of the portion 8 of the cavity 4.

The cap 1 comprises a tongue 11 including a first end 11*a* and a second end 11*b* opposite to the end 11*a*. The tongue 11 crosses a through hole 12 obtained in the aforesaid second portion of wall 2 (extending from the wall 6 to the opening 5) so that the tongue 11 is housed in the portion 8 of the cavity 4 at a first section (of tongue 11) including the end 11*a*, and lies outside the cavity 4 at a second section (of tongue 11) including the end 11*b*. The tongue 11 is at least partially sliding in the hole 12 and is at least partially opposite to the wall 6 at the aforesaid first section (housed in the portion 8 of cavity 4). Preferably, the tongue 11 is substantially rectilinear and substantially parallel to the wall 6.

The tongue 11 is connected to the wall 6 at the aforesaid first section of the same (including the end 11*a*) and is graspable by a person at the second section thereof (including the end 11*b*). The connection between the tongue 11 and the wall 6 is sufficiently intense so that,

- on applying a force to the tongue 11 (at the section of the same including the end 11*b*) tending to cause the tongue 11 to slide in such a way that the end 11*a* moves close to the hole 12,
- a sliding of the tongue 11 in such a way that the end 11*a* moves close to the hole 12 determines an at least partial tearing of the wall 6 by the tongue 11 and an at least partial pulling of the wall 6 towards the hole 12 by the tongue 11, with a deformation of the wall 6.

With reference to FIG. 2 it is possible to note that the tongue 11, at the end 11*a*, is preferably shaped so as not to be able to cross the hole 12. On applying a force to the tongue 11 (at the section of the same including the end 11*b*) tending to cause the tongue 11 to slide in such a way that the end 11*a* moves close to the hole 12, therefore, the tongue 11 cannot be completely removed from the cavity 4.

Again with reference to FIG. 2 it is possible to note that the tongue 11 is connected to the wall 6 preferably at least at, or close to, a section of the edge of the wall 6. More preferably, the aforesaid edge section of wall 6 at or close to which the tongue 11 is connected to the wall 6 is diametrically opposite to a projection, orthogonal to the wall 6, of the hole 12 on the edge of the wall 6.

Furthermore, it is also possible to note in FIG. 2 that the wall 6 preferably comprises one or more facilitated breaking lines 13. More preferably, at least one facilitated breaking line 13 extends at least partially along the edge of the wall 6 or close to the latter. Even more preferably, at least one facilitated breaking line 13 extends over the entire edge of the wall 6 (or close to the latter), or extends over the edge of the wall 6 (or close to the latter) except for a section of said edge including the aforesaid projection, orthogonal to the wall 6, of the hole 12 on the edge of the wall 6.

Finally, with reference to FIG. 2 it is possible to note that the wall 6 preferably comprises one or more facilitated folding lines 14. More preferably, the facilitated folding lines 14 extend from one point to another of the edge of the wall 6. Even more preferably, the facilitated folding lines 14 are arranged orthogonally to the direction along which the tongue 11 extends (i.e. they are arranged orthogonally to a diameter of the edge of the wall 6 extending from the aforesaid edge section of wall 6 at which the tongue 11 is connected to the wall 6, and the aforesaid projection, orthogonal to the wall 6, of the hole 12 on the edge of the wall 6). The facilitated folding lines 14 are shown by way of example equal to two in number.

Figure 4:
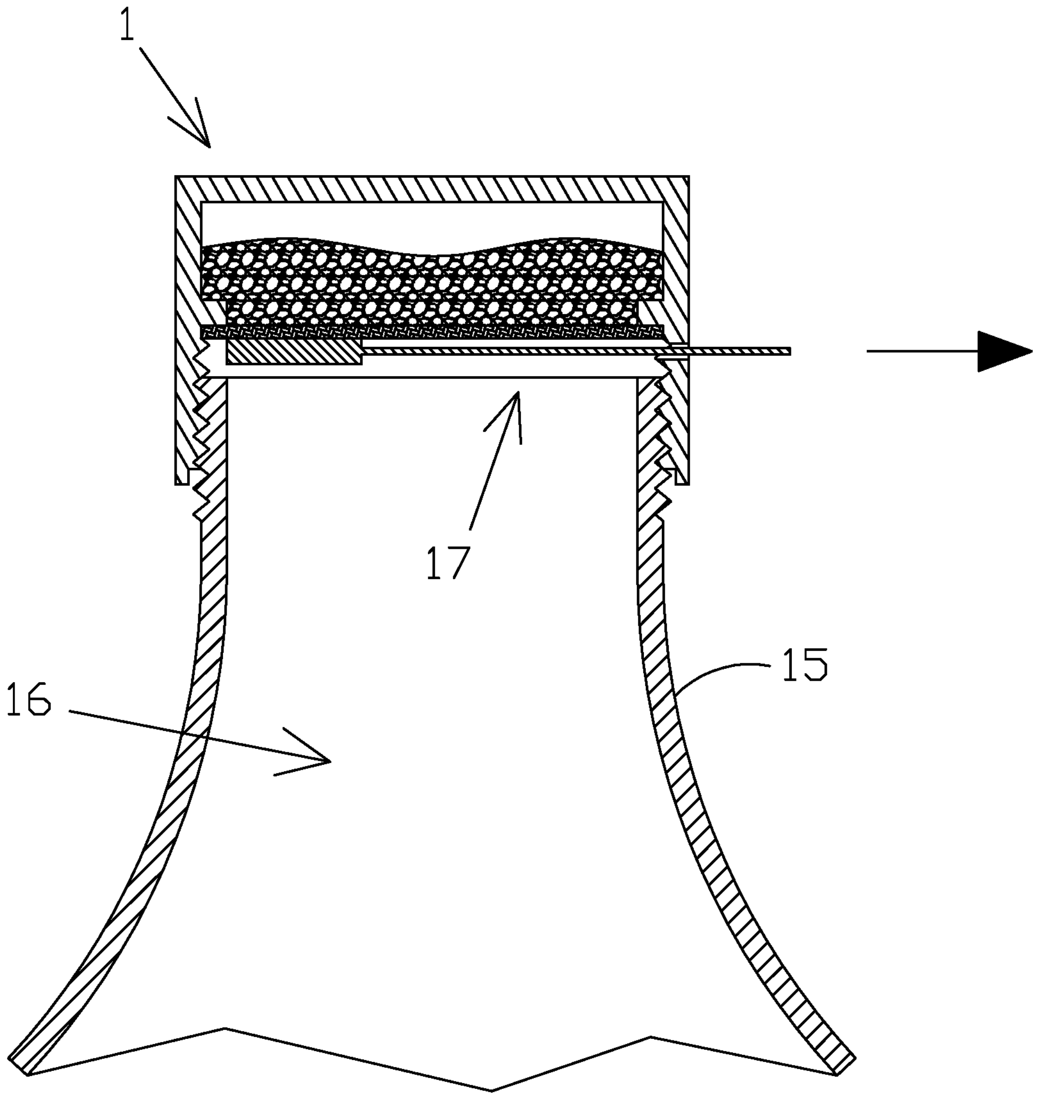
FIG. 4 shows a diagrammatic straight section of the cap in FIG. 1 connected to a container at an opening of the latter and so as to block said opening.
Figure 5:
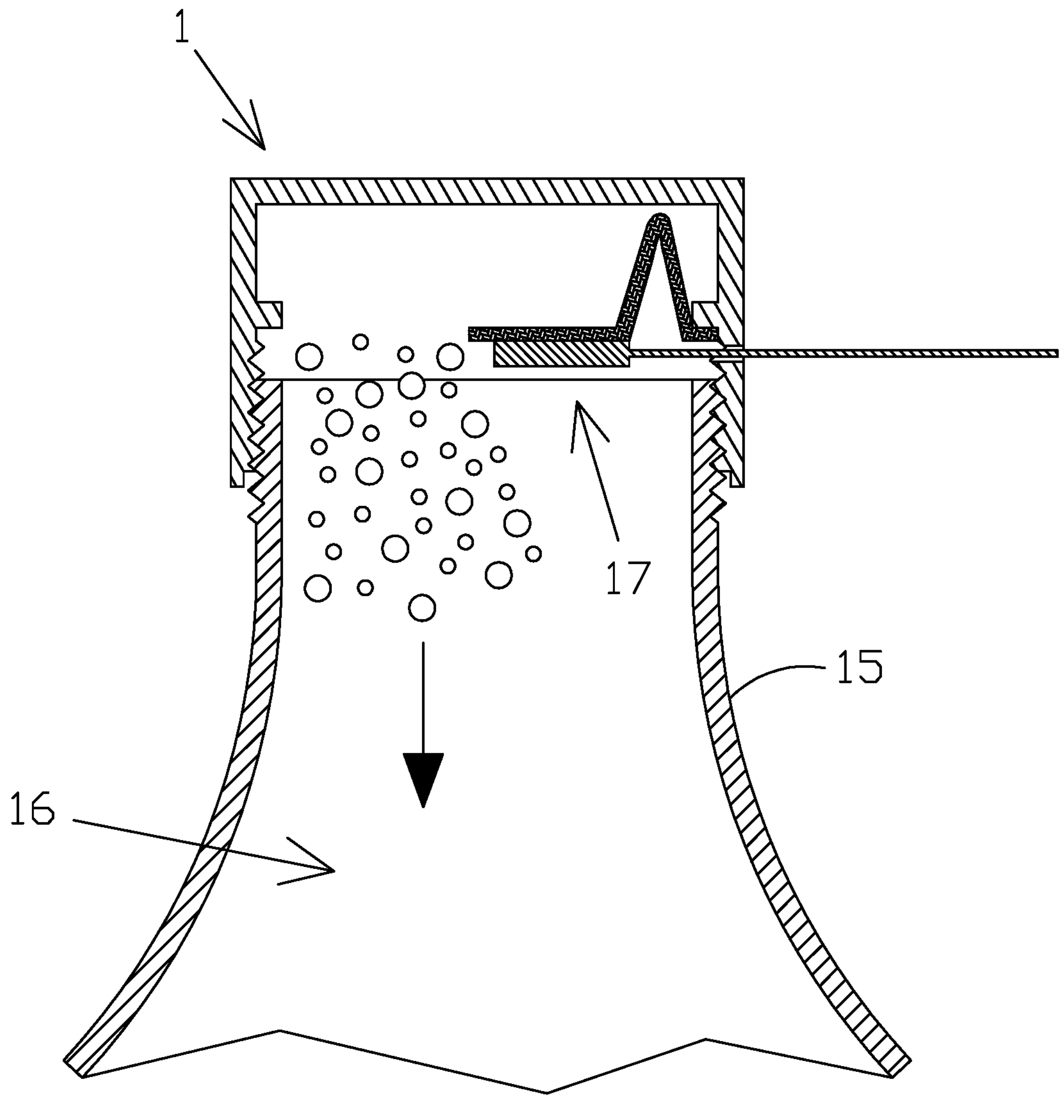
FIG. 5 shows a diagrammatic straight section of the cap in FIG. 1 connected to the container in FIG. 4 following a tearing of a dividing wall inside said cap.

FIG. 4 shows the cap 1 connected to a container 15 comprising a cavity 16 and an opening 17 for accessing the same. By way of example, the container 15 is a bottle and, at the opening 17, it is preferably cylindrical and threaded externally, so as to form a "neck". As stated previously, it is at the second portion of wall 2 (extending from the wall 6 to the opening 5) that the cap 1 is connectable to the container 15. More precisely, the thread (internal) of the wall 2 is coupleable to the thread (external) of the container 15 so that the cap 1 can be screwed to the latter and unscrewed from the same. In the light of this, the cap 1, at the opening 5, is reversibly connectable to the container 15 at the opening 17, blocking the latter and in such a way that the portion 8 of the cavity 4 of the cap 1 is in communication with the cavity 16 of the container 15. When the cap 1 is connected to the container 15, the wall 6 is interposed between the base 3 and the opening 17. Due to the above, an at least partial tearing of the wall 6 puts the section 7 in communication with the cavity 16 of the container 15.

A screwing of the cap 1 to the container 15, like an unscrewing of the one from the other, is preferably facilitated by the presence of elevations 18 protruding longitudinally from the wall 2 outside the cavity 4. In fact, the elevations 18 increase the friction between the hand of a person grasping the cap 1 and the wall 2 of the latter.

In order to cause the substance 9 enclosed in the section 7 to fall inside the cavity 16 of the container 15, it is sufficient to grasp the tongue 11 at the section of the same outside the cavity 4 and apply a force tending to cause the tongue 11 to slide so as to move the end 11*a* close to the hole 12 (as shown with an arrow in FIG. 4). The force must be sufficiently intense so as to cause the tongue 11 to slide in the aforesaid manner tearing the wall 6 and pulling the latter (deforming it, for example, by folding it on itself along the lines 14) towards the hole 12, so as to obtain the configuration shown in FIG. 5 (where the substance 9 falls into the cavity 16 of the container 15). The tongue 11 falls within the means previously classified as "tearing means" for tearing the wall 6.

By way of example, advantageously, the cap 1 allows preventing previously flavored and/or carbonated beverages from having to be placed on the market. In particular, instead of previously flavored and/or carbonated beverages, it is possible to place non-carbonated water contained in containers onto the market respectively closed by caps, such as the one, which is the subject of the invention, housing, in the section 7 a particular flavoring and/or an effervescent substance (i.e. which produces effervescence). It is also possible to consider the possibility of placing caps 1 on the market with different flavorings and/or effervescent substances. In this case, a person who desires to taste a beverage with a particular flavoring and/or effervescence must simply obtain a container containing non-carbonated water to screw to the same a cap, such as the one which is the subject of the invention, including the desired flavoring and/or effervescent substance.

Based on the description provided of a preferred embodiment, it is apparent that changes may be introduced by a person skilled in the art without thereby departing from the scope of the invention as defined by the following claims.

The invention claimed is:

1. A cap comprising:

a cavity delimited by a side wall and by a base placed at a first end of said cap;

an opening for accessing said cavity, said opening being at least partially delimited by said side wall and being at a second end of said cap opposite to said first end;

a dividing wall housed in said cavity and connected to said side wall in an intermediate position between said base and said opening, said dividing wall comprising one or more facilitated folding lines, said dividing wall being connected to said side wall along an edge thereof so as to separate said cavity into:

a first portion delimited by said dividing wall, by said base and by a first portion of said side wall extending from said dividing wall to said base, said first portion of cavity corresponding to a section of said cap;

a second portion delimited by said dividing wall, by said opening and by a second portion of said side wall extending from said dividing wall to said opening, said cap, at said second portion of side wall, being reversibly connectable to a container comprising a cavity and an opening for accessing the same, said cap being reversibly connectable to said container at the opening of the container and in such a way that said second portion of cavity of said cap is in communication with said cavity of said container;

means for tearing, at least partially, said dividing wall, when said cap is reversibly connected to said container, an at least partial tearing of said dividing wall putting said section into communication with said cavity of said container, wherein said tearing means comprise a tongue including a first end and a second end opposite to said first end of the same, said second portion of side wall comprising a through hole, said tongue crossing said through hole so as:

to be housed in said second portion of cavity of said cap at a first section thereof including the first end thereof and so as to lie outside said cavity of said cap at a second section thereof including the second end thereof, said tongue, at said first section, being at least partially opposite to said dividing wall, said tongue being connected to said dividing wall at the first section thereof and being graspable by a person at the second section thereof, said tongue being at least partially sliding in said through hole, the connection between said dividing wall and said tongue being sufficiently intense so that, on applying a force to said tongue, at said second section of the same, tending to cause said tongue to slide in such a way that said first end of the same moves close to said through hole, a sliding of said tongue in such a way that said first end of the same moves close to said through hole determines at least a partial tearing of said dividing wall by said tongue and at least a partial pulling of said dividing wall towards said through hole by said tongue, with a deformation of said dividing wall.

2. The cap according to claim 1, wherein said tongue, at said first end, is shaped so as not to be able to cross said through hole.

3. The cap according to claim 2, wherein said dividing wall comprises one or more facilitated breaking lines.

4. The cap according to claim 2, wherein said tongue is connected to said dividing wall at least at a section of said edge of the same.

5. The cap according to claim 1, wherein said dividing wall comprises one or more facilitated breaking lines.

6. The cap according to claim 5, wherein said one or more facilitated breaking lines extend, at least partially, along said edge of said dividing wall.

7. The cap according to claim 6, wherein said tongue is connected to said dividing wall at least at a section of said edge of the same.

8. The cap according to claim 7, wherein said edge of said dividing wall is circular, said section of said edge at which said tongue is connected to said dividing wall being diametrically opposite to a projection, orthogonal to said dividing wall, of said through hole on said edge.

9. The cap according to claim 8, wherein one of said facilitated breaking lines extends over the entire edge of said dividing wall, or extends over the edge of said dividing wall except for a section of said edge including said projection, orthogonal to said dividing wall, of said through hole on said edge.

10. The cap according to claim 5, wherein said tongue is connected to said dividing wall at least at a section of said edge of the same.

11. The cap according to claim 1, wherein said one or more facilitated folding lines extend from one point to another of said edge of said dividing wall.

12. The cap according to claim 11, wherein said edge of said dividing wall is circular, said section of said edge at which said tongue is connected to said dividing wall being diametrically opposite to a projection, orthogonal to said dividing wall, of said through hole on said edge, and wherein said one or more facilitated folding lines are arranged orthogonally to a diameter of said edge of said dividing wall extending from said section of said edge, at which said tongue is connected to said dividing wall, to said projection, orthogonal to said dividing wall, of said through hole on said edge.

13. The cap according to claim 1, wherein said tongue is connected to said dividing wall at least at a section of said edge of the same.

* * * * *